July 15, 1941.    B. M. SAJNAJ    2,249,399
PASTRY CUTTER
Filed Feb. 7, 1939

Bernice M. Sajnaj.
INVENTOR

BY Victor J. Evans & Co.
ATTORNEYS

Patented July 15, 1941

2,249,399

UNITED STATES PATENT OFFICE 2,249,399

PASTRY CUTTER

Bernice M. Sajnaj, La Salle, Ill.

Application February 7, 1939, Serial No. 255,143

1 Claim. (Cl. 30—302)

This invention relates to pastry cutters, and its general object is to provide a cutter that is designed for one purpose only, namely for cutting dough in the process of making cookies and the like to simulate flowers, in that it cuts the dough to form petal like portions integral with and radiating from a circular central portion, thereby producing an attractive flower like design, and the petal like portions may be further cut radially or otherwise as well as additional petal like portions added to the central portion, so as to produce cookies of various flower like designs.

Another object is to provide a pastry cutter of the character set forth, that materially saves time and labor in the process of making the type of cookies and the like referred to, and the cutter can be easily cleaned, is simple in construction, inexpensive to manufacture, and extremely efficient in use and service.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawing wherein like characters denote like or corresponding parts throughout the several views, and in which.

Figure 1:
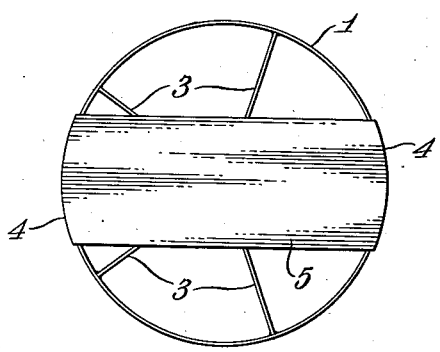
Figure 1 is a top plan view of the pastry cutter which forms the subject matter of the present invention.
Figure 2:
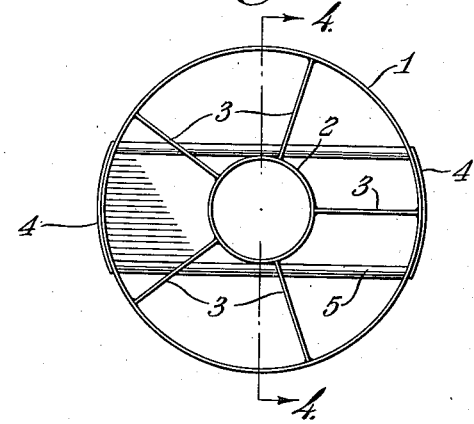
Figure 2 is a bottom plan view thereof.
Figure 3:
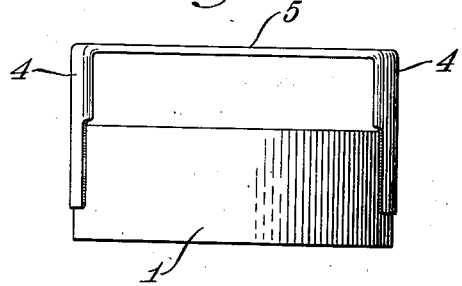
Figure 3 is a side view.

Referring to the drawing in detail, it will be noted that my pastry cutter includes an outer annular blade 1 and an inner annular blade or collar 2, the blades being concentrically arranged with respect to each other and secured to and radiating outwardly from the inner blade is a plurality of equi-distantly spaced radial blades 3 having their outer ends secured to the outer blade, for the disposal of the blades 3 in bridging relation with respect to the blades 1 and 2, as clearly shown in Figure 2.

Figure 4:
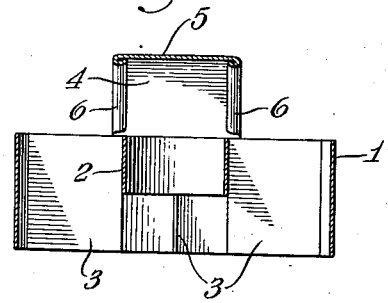
Figure 4 is a sectional view taken approximately on line 4—4 of Figure 2, looking in the direction of the arrows.

From Figure 4, it will be noted that the height of the radial blades 3 is the same as that of the outer blade 1, so that the upper and lower edges thereof are flush with each other, for providing a complete cut through relatively thick dough and so that the cut portions of the dough will be separated from each other. However, the height of the inner blade or collar 2 is half or approximately so, as that of the other blades, and the inner blade is arranged a considerable distance above the lower edges of the other blades, so that when the cutter is in use, the outer and radial blades will cut through the dough, but the inner blade may not contact the dough or may partially cut therethrough, and in no event will it cut completely through the same. If the inner blade penetrates or partially cuts the dough, it will be obvious that such will make a circular impression therein, to provide a central portion for a flower like design, while the other blades which cut through the dough will produce petal like portions cooperating with the central portion to provide a cookie or the like, of flower like design. The dough cut as set forth, may be further cut or pieces added thereto to provide cookies of other flower like designs as will be apparent.

I also provide a handle for my cutter and the handle in the form as shown is of the bail type, to include parallel arms 4 transversely curved to follow the shape of the outer blade and secured to its outer surface upon diametrically opposite sides thereof, in a manner to space the upper portion 5 of the handle a considerable distance above the blades, to allow for ample thumb and finger receiving space, when the upper portion 5 is gripped during the use of the cutter, as will be apparent upon inspection of Figure 4. The edges of the handle above the blades are beaded as at 6, especially if the cutter is made from sheet metal as indicated in the drawing, but of course it will be understood that the cutter can be made from any material suitable for the purpose, and in any event into a single integral unit. The blades are secured together by any suitable means or are molded into one piece, so as to eliminate obstructions or the like at the juncture of the blades with each other.

It is thought from the foregoing description that the advantages and novel features of the invention will be readily apparent.

It is to be understood that changes may be made in the construction and in the combination and arrangement of the several parts, provided such changes fall within the scope of the appended claim.

What I claim is:

A cutter to produce pastry of flower like design, and comprising concentrically arranged annular blades, radial blades fixed to and bridging the annular blades and arranged in equi-distantly spaced relation with respect to each other, the radial blades being of the same height as the outer annular blade and having their upper and lower edges flush with the edges of the latter blade, the inner annular blade being of a height approximately half of that of the outer and radial blades and having its upper edge flush with the upper edges of the latter blades, and a bail type handle for the cutter and including parallel arms transversely curved to follow the shape of the outer annular blade and secured thereto upon diametrically opposite sides thereof, and the arms and bight portion of the handle having beaded edges and the beaded edges of the arms being disposed above the outer annular blade.

BERNICE M. SAJNAJ.